United States Patent [19]

Koppe et al.

[11] 4,210,167
[45] Jul. 1, 1980

[54] EMISSION-FREE VALVE

[75] Inventors: Werner Koppe, Weinstadt; Rolf Prümmer, Kornwestheim, both of Fed. Rep. of Germany

[73] Assignee: Herion-Werke AG, Fellbach, Fed. Rep. of Germany

[21] Appl. No.: 917,396

[22] Filed: Jun. 20, 1978

[30] Foreign Application Priority Data

Jun. 30, 1977 [DE] Fed. Rep. of Germany ....... 2729522

[51] Int. Cl.² .................... F16K 27/10; B23K 21/00
[52] U.S. Cl. ................................. 137/375; 251/141; 251/366; 228/107; 228/265; 29/421 E; 29/157.1 R
[58] Field of Search ............... 137/375; 228/107, 265; 29/421 E, 157.1; 251/141, 366

[56] References Cited

U.S. PATENT DOCUMENTS

| | | | |
|---|---|---|---|
| 3,036,373 | 5/1962 | Drexelius | 29/421 E |
| 3,292,253 | 12/1966 | Rossner | 228/107 |
| 3,344,509 | 10/1967 | Kunsagi et al. | 228/107 |
| 3,535,767 | 10/1970 | Doherty, Jr. et al. | 228/107 |
| 3,562,887 | 2/1971 | Schroeder | 228/107 X |
| 3,987,529 | 10/1976 | Nakagawa et al. | 228/107 X |
| 4,044,737 | 8/1977 | Nishimura | 137/375 X |

FOREIGN PATENT DOCUMENTS 1336541 7/1963 France .................... 251/141

*Primary Examiner*—Arnold Rosenthal
*Attorney, Agent, or Firm*—Michael J. Striker

[57] ABSTRACT

A valve for controlling the flow of dangerous fluids includes a housing having a housing member equipped with connecting nipples and with a valve seat formed on a discrete seat member, a magnet-supporting socket connected to the housing member and bounding a compartment therewith, and a valve member accommodated in the compartment and displaceable toward and away from the seat to control the flow of the fluid through the compartment between the connecting nipples. A layer of corrosion-resistant material is explosion welded to and covers the internal surface of the housing. The magnet-supporting socket includes two components of materials which are incapable of being welded to one another in a melt-welding operation, the components being connected to one another by explosion-welding. The housing member is deformed from an originally cylindrical to a spherical configuration during the explosion-welding operation which welds the layer of the corrosion-resistant material to the internal surface of the housing member. The seat member is explosion-welded to the housing member and may be a composite of two layers one of which is of a corrosion-resistant material and faces the compartment, and the other of which is of the material of the housing member and is juxtaposed with and explosion-welded to the housing member.

3 Claims, 12 Drawing Figures

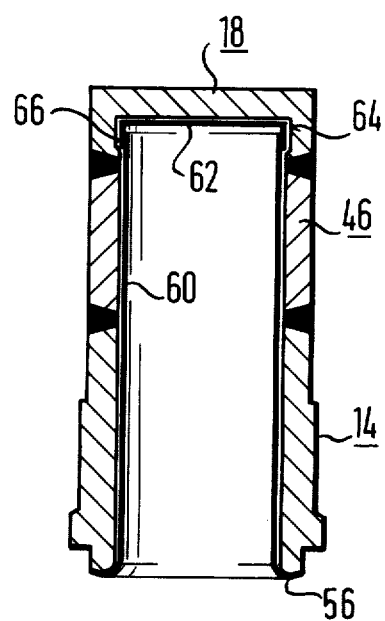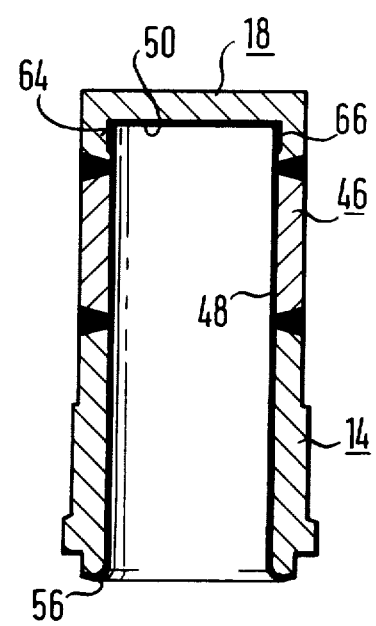

EMISSION-FREE VALVE

BACKGROUND OF THE INVENTION

The present invention relates to an emission-free valve, particularly a magnetically operated valve, for use in controlling the flow of fluids, especially poisonous, radioactive, aggressive or otherwise dangerous gases or liquids, as well as to a method of manufacturing the same.

Various constructions of valve are already known and, so long as they are magnetically operated, they usually include a valve housing that incorporates a housing member equipped with connecting nipples, a magnet-supporting sleeve connected to the housing member, as well as a valve member which is displaceable by an electromagnet and which cooperates with a valve seat in the housing member.

When the valve of the above-mentioned type is to be used for controlling the flow of, for instance, radioactive or poisonous fluids, but even for combustible, explodable or aggressive media, a requirement that the housing be leak-proof to the exterior to a considerable degree is to be satisfied. In addition thereto, these valves must be sufficiently resistant to the action of these fluids or media, which is a necessary precondition especially when the fluids or media fall into the aggressive category.

Now, there are already known materials, such as, for instance, tantalum, titanium, silver or gold which satisfy the above-requirements, but these materials are very expensive and, in addition thereto, have a high specific weight and a low mechanical strength, so that it is not feasible to fully manufacture the valves for these purposes from these materials.

SUMMARY OF THE INVENTION

Accordingly, it is a general object of the present invention to avoid the disadvantages of the prior art.

More particularly, it is an object of the present invention to provide a valve which satisfies the above-mentioned requirements.

A further object of the present invention is to so construct the valve as to be leak-proof and highly resistant to the corroding action of the media flowing therethrough.

A concomitant object of the present invention is to so design the valve as to be simple in construction, relatively inexpensive to manufacture and reliable in operation nevertheless.

An additional object of the present invention is to develop and method of manufacturing the valve which is simple and inexpensive to perform and results in a valve satisfying the above requirements.

In pursuance of these objects and others which will become apparent hereafter, one feature of the present invention resides, briefly stated, in an emission-free valve, particularly a magnetically operated valve, for use in controlling the flow of fluids especially poisonous, radioactive, and aggressive and otherwise dangerous gases and liquids, which comprises a housing having an internal surface surrounding a compartment for the respective fluid; a valve member movably mounted in said compartment; and an explosion-welded plating layer of a corrosion-resistant material covering the internal surface of the housing. A suitable corrosion-resistant material which may be used for the plating layer is, for instance, tantalum.

According to the present invention, it is further proposed to give a housing member of the housing a substantially spherical configuration during an explosion which simultaneously deforms initially cylindrical tubular and coaxially arranged housing member and plating layer preforms and explosion-welds the plating layer preform to the housing member preform.

Another aspect of the present invention resides in the fact that the housing includes at least two components of materials which are not mutually weldable in a melt-welding operation, which components are connected to one another in an explosion-welding operation. Another facet of the present invention is to be found in the fact that the housing includes a housing member and an annular seat member explosion-welded to the housing member and cooperating with the valve member to control the flow of the fluid through the compartment. Then, it is especially advantageous and contemplated by the present invention to make the annular seat member as a composite of two layers one of which faces the compartment and is of a corrosion-resistant material, while the other of the two layers is juxtaposed with and is of the same material as the housing member.

The present invention is also directed to a method of manufacturing a valve housing of the above-mentioned valve, which method comprises the steps of forming the housing, and explosion-welding a plating layer of a corrosion-resistant material onto the internal surface of the housing to cover the same. Then, it is advantageous when the forming step includes arranging a cylindrical tubular plating layer preform coaxially within a cylindrical tubular housing member preform, and when the explosion-welding step includes exploding an explosive charge within the confines of the plating member preform to simultaneously explosion-weld the same to the housing member preform and deform the latter to a substantially spherical configuration. In this connection it is especially advantageous when the forming step further includes confining the housing member preform in a confining space of a mold which has an inner surface conforming in configuration to the desired configuration of the external surface of the housing member, for the duration of the explosion-welding step.

It is further advantageous when the magnet-supporting socket is formed by assembling two components thereof which are of materials that are not mutually weldable in a melt-welding operation, and joining the components with one another in an explosion-welding operation. In this context it is especially advantageous when one of the two components is provided with an annular collar having a frusto-conical inner surface, the assembling step then including partially introducing the other component into the annular collar of the one component, and when the magnet-supporting socket is shaped to a desired configuration in a material-removing operation following the joining step.

It is further proposed, according to a currently preferred advantageous aspect of the present invention to provide the magnet-supporting socket with a circumferential and an end wall which together bound a blind passage, and with an internal annular groove at the juncture of the walls. Then, the explosion-welding step includes so juxtaposing a generally pan-shaped preform having a rim and being of the corrosion-resistant material from within the blind hole with the end wall of the magnet-supporting socket that the rim coextensively adjoins the groove, so arranging a tubular preform of the corrosion-resistant material within the blind hole in juxtaposition with the circumferential wall of the magnet-supporting socket that the rim partially overlaps the same, and exploding an explosive charge within the tubular preform to simultaneously explosion-weld the preforms to the magnet-supporting socket and to one another and press the region of overlap of the preforms into the groove.

It is further preferred to so provide the above-mentioned valve seat that a discrete substantially frusto-conical annular seat member at least partially constituted by a corrosion-resistant material, is explosion-welded to the housing, and the valve seat is provided on the explosion welded seat member in a material-removing operation. In this context, it is further advantageous when the discrete seat member is made as a composite of layers of the material of the housing and of the corrosion-resistant material for the seat member, which composite is shaped to the configuration of the seat member, whereupon the seat member is so arranged in the compartment of the housing that the layer of the corrosion-resistant material faces the compartment and the layer of the material of the housing is juxtaposed with the housing.

When resorting, in accordance to the present invention, to the above-mentioned explosion welding, there is obtained an intimate, non-porous and hermetic metallic bond. A particular advantage of the present invention is to be seen in the fact that even such metals which cannot be welded to one another in a melt-welding operation, such as, for instance aluminum and alloyed steel, or steel and tantalum, can be bonded with one another in this manner.

Explosion-welding and explosion-deformation procedures per se are already known. However, it has not been attempted heretofore to inwardly plate a complete valve housing by resorting to the explosion-welding operation and, it has not been heretofore successfully attempted to simultaneously deform the valve housing in the explosion-deforming operation and to provide a plating layer at its internal surface by explosion welding.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIGS. 2a and 2b are views similar to FIG. 1 but showing only the magnet-supporting socket of the valve housing prior to and subsequent to the explosion-welding operation;

DETAILED DESCRIPTION OF THE PREFERRED EMBODIMENTS

Figure 1:
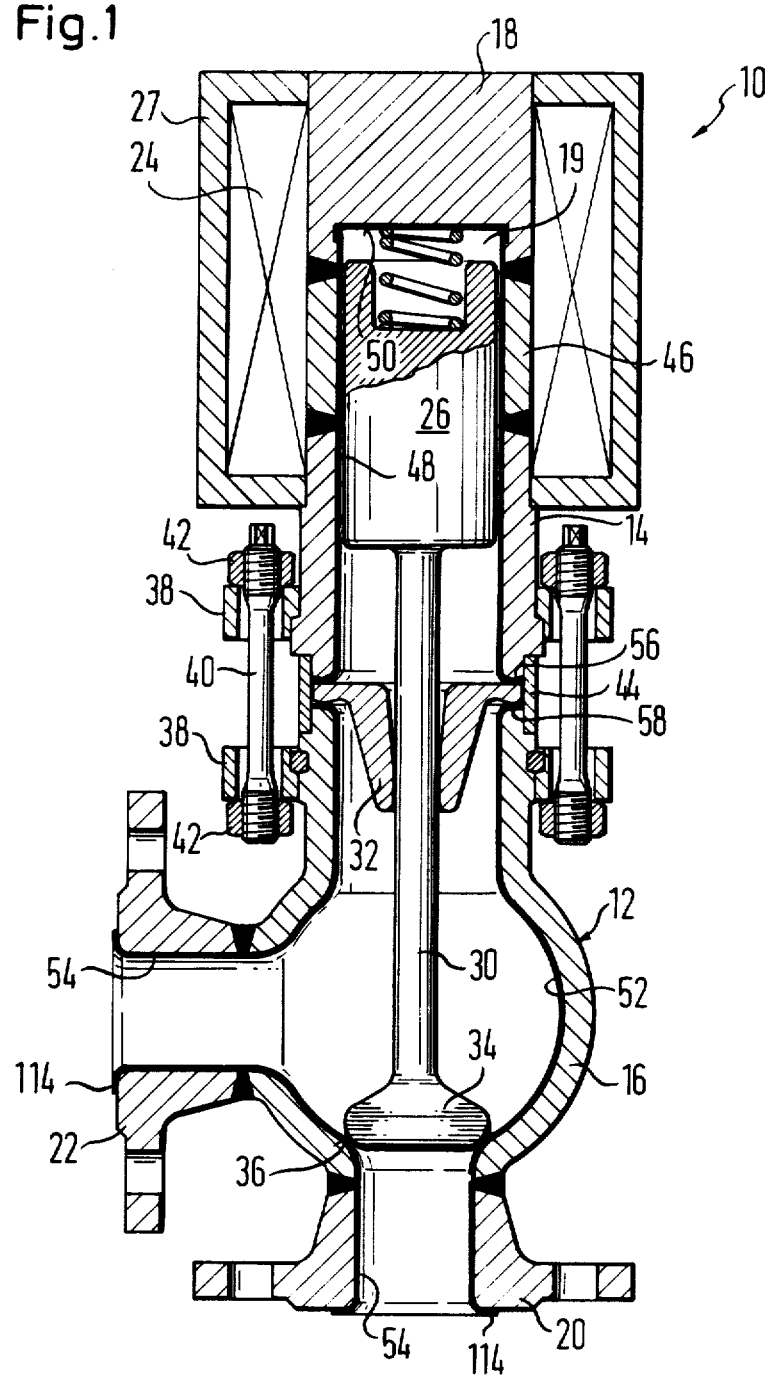
FIG. 1 is a sectional view of a valve according to the present invention.

Referring now to the drawing in detail, and first to FIG. 1 thereof, it may be seen that the reference numeral 10 has been used to designate a valve of the present invention in toto. The valve 10 includes a housing 12 having a lower housing member 16 and a magnet-supporting sleeve 14, 18 which is connected to the housing member 16. Connecting flanges 20, 22, constituting connecting nipples, are weldingly connected to the lower housing member 16. The lower housing member 16 is constituted by, for instance, elevated-temperature steel, such as that used for constructing boilers or the like, while the magnet-supporting socket 14 is of a martensitic chromium steel which is magnetizable. A tubular section 46 is interposed between the components 14, 18 which is of a non-magnetic material, for instance of austenitic steel. An electromagnet 24 surrounds the magnet-supporting socket 14, 18, 46. The electromagnet 24 is surrounded by a jacket 27, for instance, of iron, while an armature 26 is arranged in the interior of the magnet-supporting socket 14, 18, 46 for shifting relative thereto. The armature 26 is also of a magnetizable material, for instance, a martensitic chromium steel. The magnetic flux lines of the electromagnet 24 thus extend through the armature 26, the iron jacket 27, the magnet-supporting socket 14, 18, and a gap 19 between the magnet-supporting socket 18 and the magnet armature 26.

A valve stem 30 is formed of one piece with or connected, in a suitable, conventional manner, with a magnet armature 26. The stem 30 is guided in a guide 32 and carries on its lower end as illustrated in the drawing a valve body 34. Thus, the armature 26, the stem 30 and the valve body 34 together constitute a valve member which is displaceably mounted in the interior of the housing 12. The guide 12 is attached, in a suitable manner, to the housing 12, for instance, as illustrated, by being clamped between the lower housing member 16 and the magnet-supporting socket component 14. It will be understood that the valve body 34 cooperates, in a conventional manner, with a valve seat 36 provided on the housing 12.

The magnet-supporting socket component 14 and the lower housing member 16 are connected to one another by means of holding flanges 38, threaded members 40 and nuts 42, with a certain pretension between the same, while as already mentioned, the guide 32 is clamped between the components 16 and 14. Standardized flanges are preferably used for constituting the flange connection. A centering ring 44 is arranged axially between the components 14 and 16, and the magnet-supporting socket component 14 is inserted thereinto from above while the lower housing member 16 is inserted into the sleeve 44 from below, the components 14 and 16 having suitable connecting portions which are received within the sleeve 44, as a result of which there is obtained an alignment and a centering of the two components 14 and 16 relative to one another.

The entire inner surface of the valve 10 is provided with an inner plating layer 48, 50, 52 and 54 which may be of, for instance, tantalum and have a thickness of 1 mm. The plating layer 48, 50, 52 and 54 is provided on the inner surface of the housing 12 during an explosion-welding operation, as a result of which there is obtained an intimate, hermetic and durable metallic bond between the layer 48, 50, 52, 54 and the housing 12, which bond does not deteriorate even when the valve 10 is subjected to considerable and complex stresses.

The plating layers 48 or 52 have respective ends 56 and 58 which are conducted outwardly over the end faces of the two components 14, 16 and constitute sealing portions. Inasmuch as the magnet armature 26 which is acted upon by a spring 28 in the closing direction, is completely accommodated in the interior or the internal compartment of the housing 12, the valve 10 possesses no dynamic seal through which leakage of the fluid could take place from the interior to the exterior of the housing 10. The only seal is the static seal at the sealing portions 56 and 58 of the plating layer 48 or 52. This static seal can be established in a completely hermetic manner by properly selecting the sealing force to which the components 14, 16 are subjected as a result of the action of the bolts 40 and the nuts 42.

The internal plating 54 is also somewhat prolonged over the end face even at the flanges 20 and 22, so that sealing portions 114 are formed which, together with corresponding, non-illustrated connecting tubes, also form static seals.

The plating layer 52 itself can be used to constitute the sealing surface for the valve body 34, that is, for the valve seat 36, the plating layer 52 being, for instance, honed at the region of the valve seat 36. The valve body or plate 34 then cooperates directly with the valve seat 36 which is formed by the plating layer 52.

FIGS. 2a and 2b illustrate the magnet supporting socket 14, 18 and the non-magnetic tube 46, these components, as illustrated, being welded to one another. Now, a tube 60 of tantalum and a generally pan-shaped preform 62 of tantalum which is, for instance, drawn or extruded, are so arranged in the interior of this magnet-supporting socket 14, 18, 46 in such a manner, that a rim 62 overlaps the tube 60 at a region 66. The magnet-supporting socket component 18 is provided with a groove 64 which has a somewhat larger diameter than the remainder of the blind bore surrounded by the components 14, 18 and 46, in order to be able to accommodate the increased wall thickness which results from the presence of the regions 66 of the overlap. The spacing of the tube 60 and of the pan-shaped preform 62 form the internal surface of the magnet-supporting socket 14, 18, 46 may amount to, for instance, 1 to several millimeters. The tube 60 and the pan-shaped preform 62 are provided, at their inner surfaces and in a non-illustrated manner, with an explosive charge, as is conventional, and the charge is then ignited, whereupon the tube 60 and the pan-shaped preform 62 are accelerated in the direction toward the inner surface of the magnet-supporting socket 14, 18 and 46, so that the tube 60 and the preform 62 impinge, at a high speed, the internal surface of the magnet-supporting socket 14, 18, 46 and form an intimate metallic bond therewith.

FIG. 2b illustrates the finished magnet-supporting socket 14, 18, 46 which is provided, at its internal surface with the finished plating layer 48 and 50. As illustrated, the region 66 of overlap is accommodated in the groove 64 so that there is obtained a uniform transition from the tubular plating 48 to the planar plating layer 50 at the end wall of the magnet-supporting sleeve 14, 18, 46.

Figure 3:
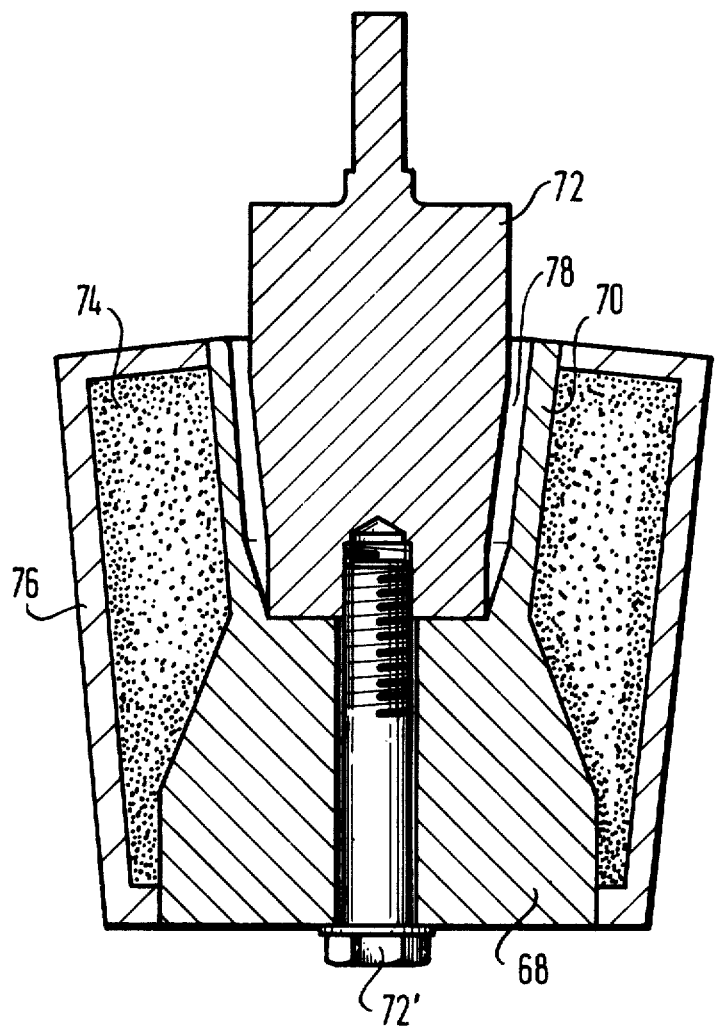
FIG. 3 is a sectional view of a preform for the magnet-supporting socket prior to the explosion-welding operation.

FIG. 3 illustrates a preform 68, as well as another preform 72, which constitute parts of the eventually obtained magnet-supporting socket 14, 18. The two preforms 68 and 72 are connected to one another by a screw 72'. The preform 68 has a tubular collar 70 which is, for instance, of a frusto-conical configuration, into which the preform 72 is introduced, while an annular gap 78 remains between the inserted part of the preform 72 and the collar 70 of the preform 68. An explosive charge 74 is arranged at the external surface of the composite preform 68, 72, 72', the charge 74 being confined in a jacket 76, for instance of a synthetic plastic material. When the explosive charge 74 is ignited, the collar 70 is accelerated in the direction toward the inserted part of the preform 72 and impinges, at a high velocity, the outer surface of the inserted part of the preform 72 and becomes connected thereto under the formation of a metallic welded bond. What is advantageous about this explosion-welding operation is that different materials, such as steel and aluminum, can be connected with one another, which is, for all intents and purposes, impossible when resorting to the normal melt-welding operation. So, for instance, the preform 72 is of an alloyed steel, while the preform 68 is, for example, of an aluminum alloy.

Figure 4:
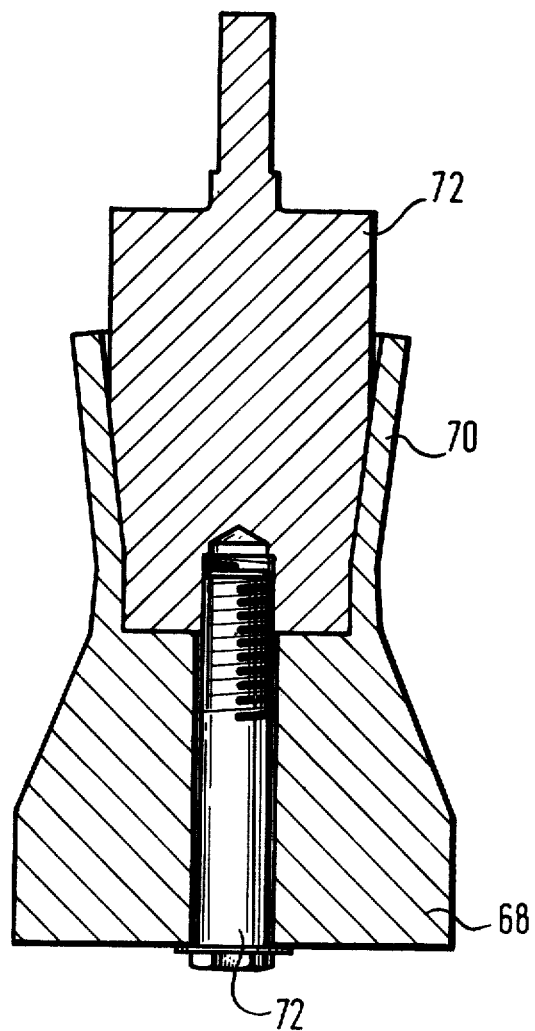
FIG. 4 is a view similar to FIG. 3 but subsequent to the explosion-welding operation.

FIG. 4 illustrates the two preforms 68 and 72 subsequent to the explosion-welding operation. It can be ascertained that the collar 70 abuts and is rigidly connected to the outer surface of the inserted part of the preform 72, having formed a metallic bond therewith.

Figure 5:
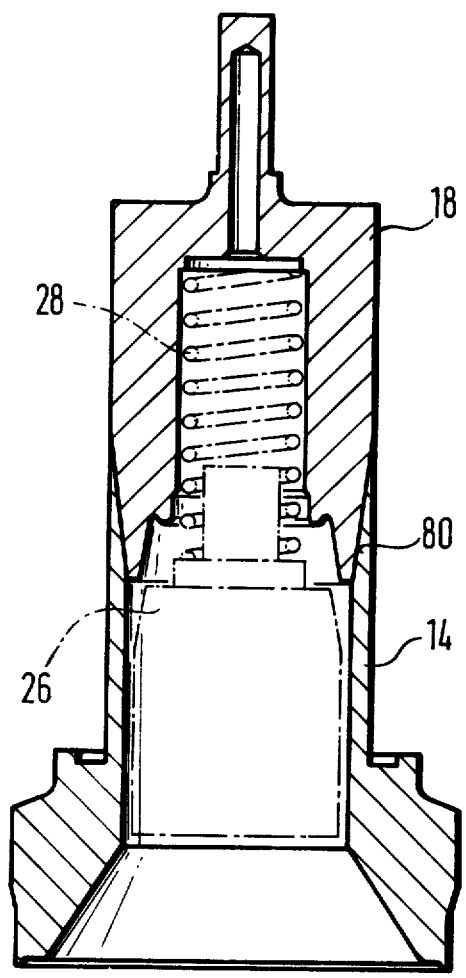
FIG. 5 is a view similar to FIG. 4 but showing the finished magnet-supporting socket.

FIG. 5 illustrates the finished magnet-supporting socket 14, 18, wherein the two components 14 and 18 are metallically connected with one another along a connecting surface 80. FIG. 5 also illustrates, in phantom lines, the magnet armature 26 and the spring 28 acting thereon which are arranged in the interior of the magnet-supporting socket 14, 18.

Figure 6:
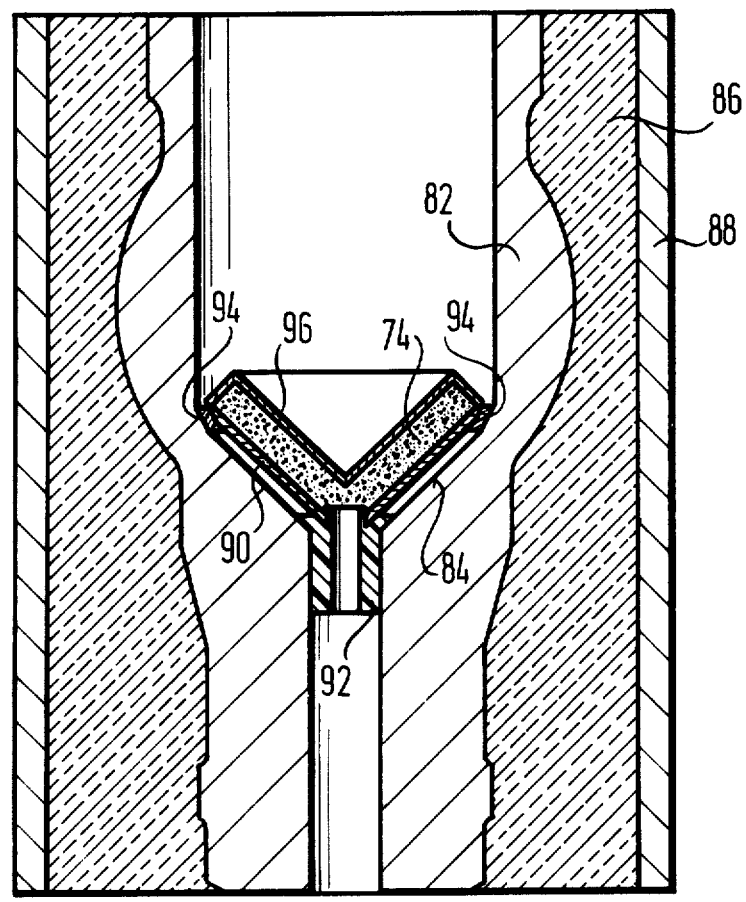
FIG. 6 is a sectional view showing a housing member and a valve seat member prior to the explosion-welding operation.

FIG. 6 illustrates the explosion-welding of a valve seat preform 90 to a valve-housing member preform 82. The valve-housing member preform 82 is accommodated in a suitable supporting mold 86 having a jacket 88. The valve seat preform 90 is to be explosion-welded to a surface 84 of the valve-housing member preform 82.

The valve-housing member preform 82 may consist of, for instance, aluminum, while the valve seat preform 90 may be made of alloyed steel. The preform 90 for the seat member, which may have a frusto-conical annular configuration, is so arranged in the valve-housing member preform 82 that a gap is obtained between the seat member preform 90 and the surface 84. To this end, there can be provided a centering sleeve 92 as well as centering projections 94, for instance, of a suitable synthetic plastic material, which hold the preform 90 in the desired position. The inner conical surface of the preform 90 is covered, as illustrated, with the explosive charge 74 which is held in place by a cover 96. When the explosive charge 74 is ignited, the frusto-conical annular preform 90 is propelled in direction toward the surface 84 and hits the latter at a high speed, forming an intimate metallic bond therewith.

Figure 7:
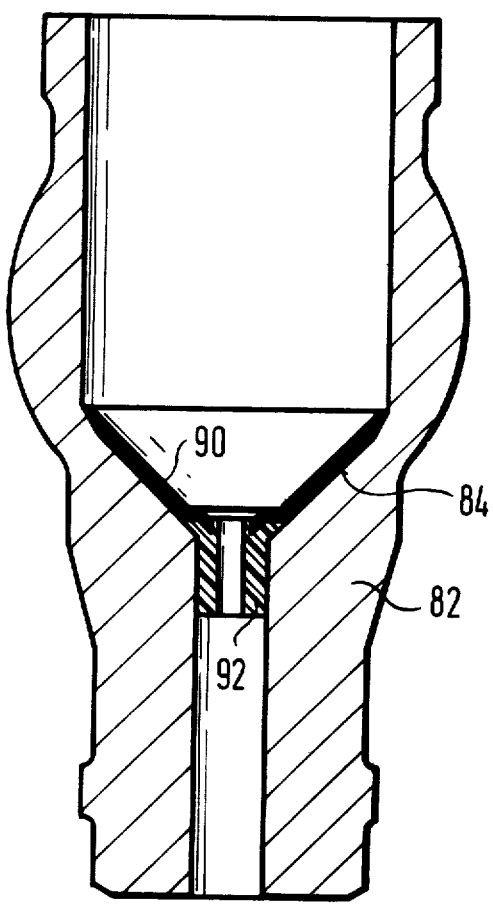
FIG. 7 is a view similar to FIG. 6 but subsequent to the explosion-welding operation.

FIG. 7 illustrates the housing preform 82 subsequent to the explosion of the charge 74. It is evident that the preform 90 has been pressed by the explosion against the surface 84 and that, as already mentioned a metallic bond has been established between the preforms 90 and 82.

Figure 8:
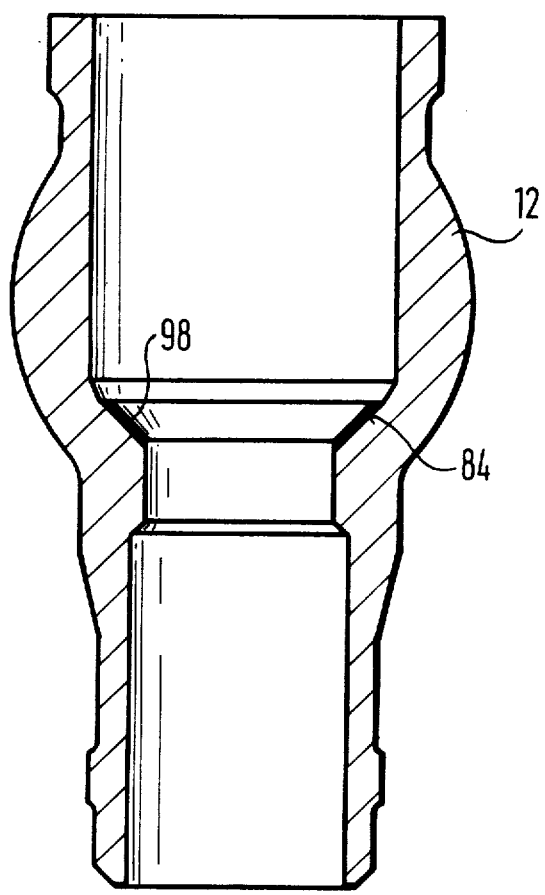
FIG. 8 is a view similar to FIG. 7 but illustrating the finished housing member.

FIG. 8 illustrates the finished valve housing 12 with a finished seat ring 98 which, even though consisting, for instance, of alloyed steel, has entered a rigid metallic bond with the housing 12 which consists, for example, of aluminum.

As already mentioned, the preform 90 can consist of steel; however, it is also possible and contemplated by the present invention for the preform 90 to already be a composite member which could have been obtained by resorting, for instance, to an electric welding procedure. Under these circumstances, the layer of the composite preform 90 which faces the compartment of the housing preform 82 is constituted by a corrosion-resistant material, while the layer which faces the surface 84 consists of the same material as the housing preform 82.

Figure 9A:
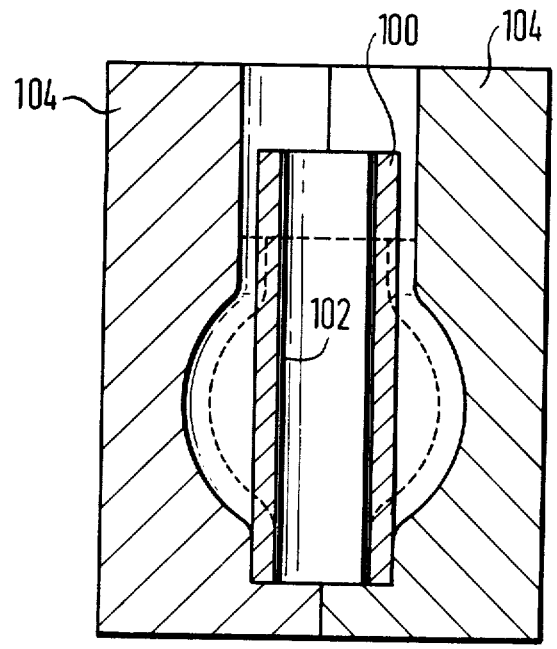
FIGS. 9a to 9c illustrate, in sectional views, three consecutive phases of the manufacture of a housing member of the housing of FIG. 1.
Figure 9B:
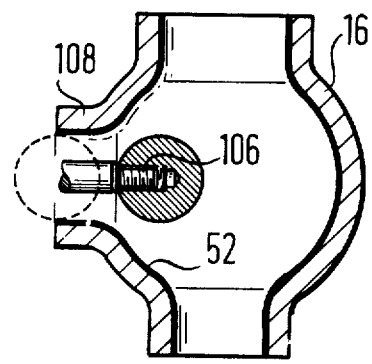
Figure 9C:
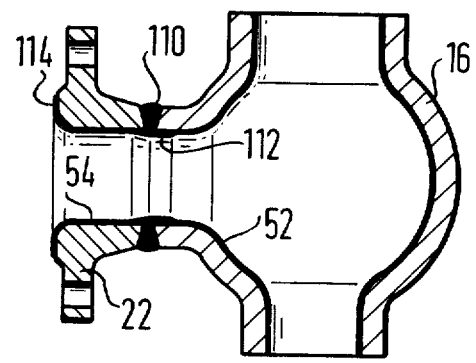

A simultaneous manufacture of the lower housing member 16 and the explosion-welding of a tantalum plating layer 52 on the internal surface thereof is illustrated, in several consecutive steps, in FIGS. 9a to 9c. As illustrated in FIG. 9a, a tube 100 is accommodated, as illustrated, in a suitable forming tool or mold 104 which, for instance, includes two mold halves. The tube 100 is intended to eventually constitute the substantially spherical housing member 16. The tube 100 is immovably confined at its lower end, as illustrated in the drawing, between the two halves of the mold 104. The tube 100 has, at its upper end, a distance from the inner surface of the mold 104 which may amount, for instance, to several millimeters. A further tube 102 is coaxially arranged in the interior of the tube 100 at a radial spacing from the inner surface of the tube 100. The tube 104 consists of the plating material, for instance, tantalum, and has a thickness of, for instance, one millimeter. The radial distance between the outer surface of the tube 102 and the inner surface of the tube 100 can amount, for instance, to 1 to 3 millimeters.

An explosive charge is provided, in a non-illustrated, conventional manner, at the inner surface of the tube 102, and the explosive charge is then ignited. During and subsequent to the actual explosion, the tube 102, on the one hand, is propelled against the tube 100, as a result of which there is obtained the explosion-weld between the two tubes 100 and 102, and thus an interior plating of the tube 100 by the material of the tube 102, while, on the other hand, the tube 100 is accelerated radially outwardly towards the inner surface of the mold 104 and is deformed by the explosion pressure into the shape predetermined by the configuration of the inner surface of the mold 104. Thus, the explosion achieves, in a single operation, the formation of the housing 16 as well as the interior plating of the housing 16 with the layer 52 of the corrosion-resistant material. After the removal of the mold 104, the substantially spherical housing member 16 is drilled at the corresponding location and provided with a nipple 108 by means of an upsetting tool, as illustrated in FIG. 9b. The intimate metallic bond between the plating layer 52 and the material of the housing member 16 remains intact during the upsetting or nipple-producing operation.

Following the nipple-producing operation, the flange 22 is welded to the nipple 108 under the formation of a welded joint 110. After this, a substantially tubular body of the corrosion-resistant plating material is introduced into the interior of the flange 22, and is connected, analogously to what has been discussed above, in an explosion welding operation, to the internal surface of the flange 22. This plating layer 54 extends across the welded joint 110 and somewhat overlaps the plating layer 52 of the housing member 16, so that a region 112 of overlap is obtained following the last-mentioned explosion-welding operation. The plating layer 54 is further conducted outwardly and radially around the end face of the flange 22, so that even the end face of the flange 22 is provided with the plating layer which forms a sealing portion 114 thereon.

The amount of the explosive charge may be, for instance a 0.75 multiple of the mass of the parts which are to be accelerated or plated upon or welded onto different parts, or parts to be deformed.

Thus, the present invention renders it possible to provide valves or valve housings of non-corrosion-resistant materials with plating layers of corrosion-resistant materials, such as, for instance, tantalum, by resorting to the use of the explosion-welding procedure. Furthermore, it is now rendered possible to connect to one another materials which are not weldable in normal welding procedures such as, for instance alloyed steel and aluminum. It is further possible to simultaneously form the valve 10 or any part of the valve 10 and plate the interior surface thereof.

It will be understood that each of the elements described above, or two or more together, may also find a useful application in other types of constructions differing from the types described above.

While the invention has been illustrated and described as embodied in an emission-free valve for use in controlling the flow of dangerous fluids, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An emission-free valve, particularly a magnetically operated valve, for use in controlling the flow of fluids, especially poisonous, radioactive, aggressive and otherwise dangerous gases and fluids, comprising a housing having an internal surface surrounding a compartment for the respective fluid, said housing including a housing member and an annular valve seat member explosion-welded to said housing member, said annular valve seat member being a composite of two layers one of which faces said compartment and is of a corrosion-resistant material, and the other of which is juxtaposed with and of the same material as said housing member; a valve member movably mounted in said compartment and cooperating with said valve seat member to control the flow of the fluid through said compartment; and an explosion-welded plating layer of a corrosion-resistant material covering said internal surface of said housing.

2. An emission-free valve, particularly a magnetically operated valve, for use in controlling the flow of fluids, especially poisonous, radioactive, aggressive and otherwise dangerous gases and fluids, comprising a housing including a housing member which has substantially spherical configuration and an internal surface surrounding a compartment for the respective fluid, said housing further including an annular valve seat member; a valve member movably mounted in said compartment and cooperating with said valve seat member to control the flow of the fluid through said compartment; and a plating layer of a corrosion-resistant material covering said internal surface of said housing member and also having a substantially spherical configuration corresponding to that of said housing member, said housing member and said plating layer obtaining their respective configurations during an explosion which not only simultaneously deforms initially cylindrical tubular and coaxially arranged housing member and plating layer preforms, but also welds said plating layer preform to said housing member preform so that said plating layer is explosion-welded to said housing member.

3. A valve as defined in claim 2, wherein said housing includes at least two components of materials which are not mutually weldable in a melt-welding operation; and wherein said components are connected to one another in an explosion-welding apparatus.

* * * * *